Aug. 12, 1952     L. S. BARKSDALE     2,606,569
FLUID VALVE

Filed April 9, 1945     3 Sheets-Sheet 1

INVENTOR.
LILBURN S. BARKSDALE,
BY
ATTORNEY.

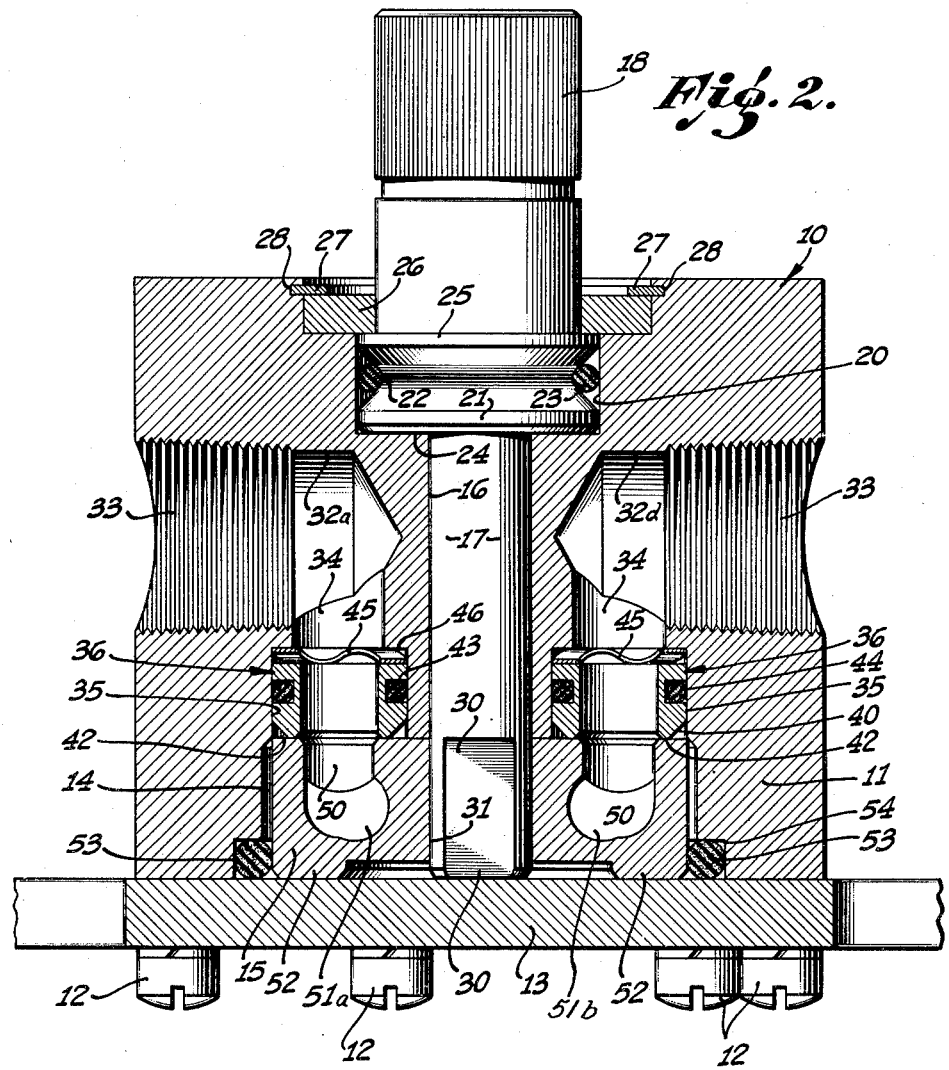
Fig. 2.
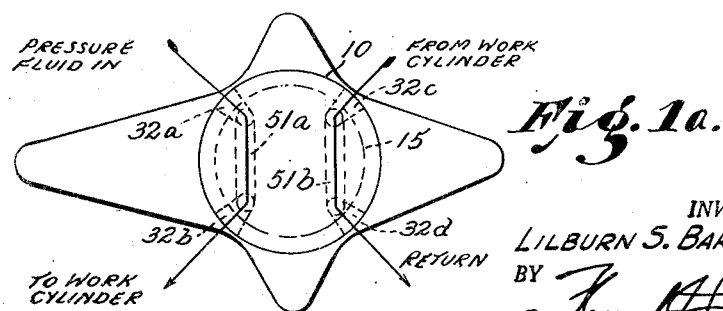
Fig. 1a.
INVENTOR.
LILBURN S. BARKSDALE,
BY
ATTORNEY.

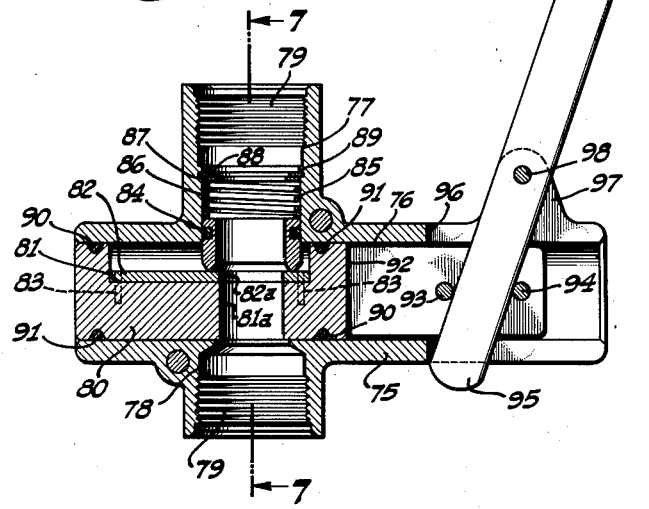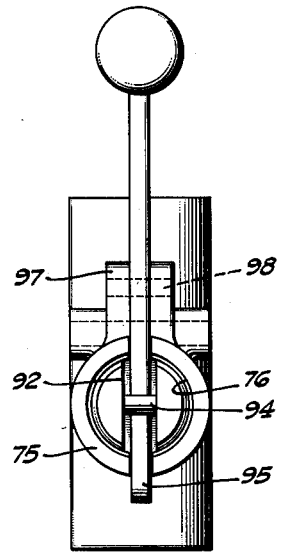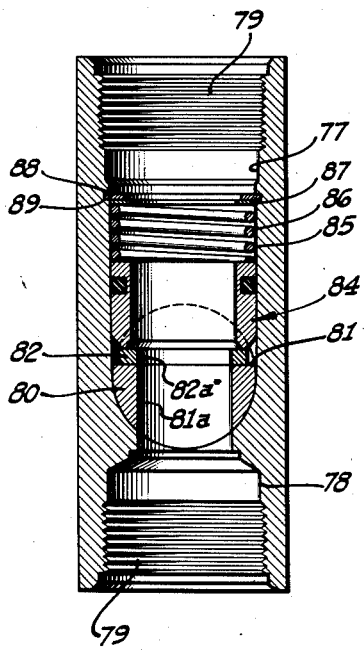

Patented Aug. 12, 1952

2,606,569

UNITED STATES PATENT OFFICE 2,606,569

FLUID VALVE

Lilburn S. Barksdale, Burbank, Calif., assignor, by mesne assignments, to Saval Division of The William R. Whittaker Company, Ltd., Los Angeles, Calif., a corporation of California Application April 9, 1945, Serial No. 587,337

5 Claims. (Cl. 137—102)

The present invention relates in general to fluid valves, and more particularly to valves for use under high pressure conditions where the problem of securing satisfactory sealing is especially critical.

My invention finds particular utility in control valves for the high pressure hydraulic systems of aircraft where fluid pressures in excess of 1000 pounds per square inch are common and where requirements as to leakage are extremely stringent. Such valves are employed, for example, where it is desired to direct the flow of hydraulic fluid from either one of two engine driven hydraulic pumps to either one of two hydraulic systems in an airplane, or from a pump to either side of a double acting cylinder or cylinders, while at the same time permitting the fluid from the other end of the cylinder to flow through the valve into the return line and back to the reservoir. A leak-proof valve is especially important in a 3000 pounds per square inch hydraulic system, since the actuating cylinders are then quite small and relatively slight leakage may cause excessive movement of the control surface actuated by the valve and cylinder. Although the several features of my invention find their most advantageous application in the field of high pressure hydraulics, it is to be understood that they may also be used to equally good advantage in low pressure systems, as well as for the control of any fluid such as air or gas, and the invention is not to be construed as limited in any way to any particular type of application.

The valve of the present invention is of a known type employing floating tubular valve seats which are yieldingly urged into sealing engagement with the valve member so that a positive seal is maintained under all normal conditions, even though the clearance between the valve member and the valve body may be relatively large.

A primary object of the present invention is to provide such a valve, but whose floating tubular valve seat is so proportioned and arranged that excessive pressure in the system due to thermal expansion of the fluid causes the seat to be lifted from its sealing engagement with the valve member, thereby permitting escape of the fluid through the clearance spaces between the valve and valve body until the excessive pressure has been relieved.

The above and other objects and advantages of my invention will appear more fully hereinafter from a consideration of the detailed description which follows, when taken in connection with the accompanying drawings wherein several embodiments of the invention are illustrated. It is to be expressly understood, however, that the drawings are for the purpose of illustration and description only, and are not designed or to be considered as defining the limits of the invention, reference being had to the appended claims for this purpose:

Fig. 1a is a diagrammatic plan view of the valve of Fig. 1;

Fig. 2 is an enlarged sectional view taken through the same; and

Figure 1:
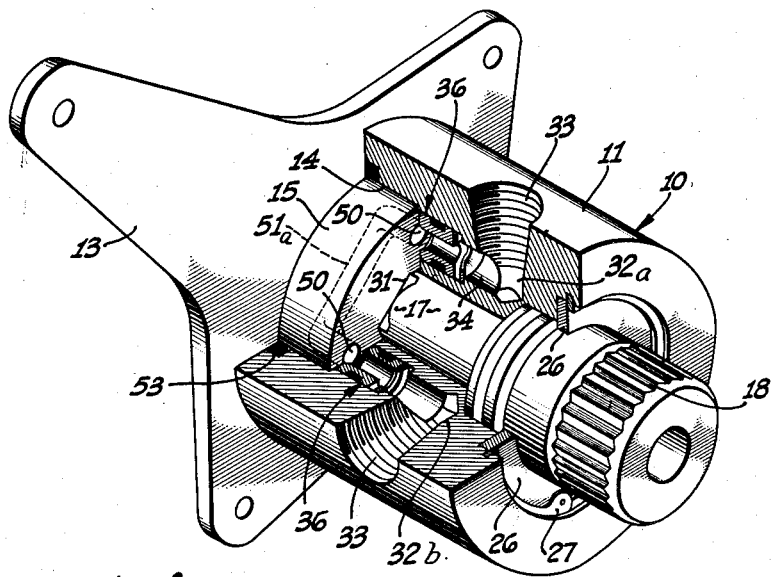
Fig. 1 is a partially sectioned perspective view of a rotary valve constructed according to the principles of my invention.
Figure 3:
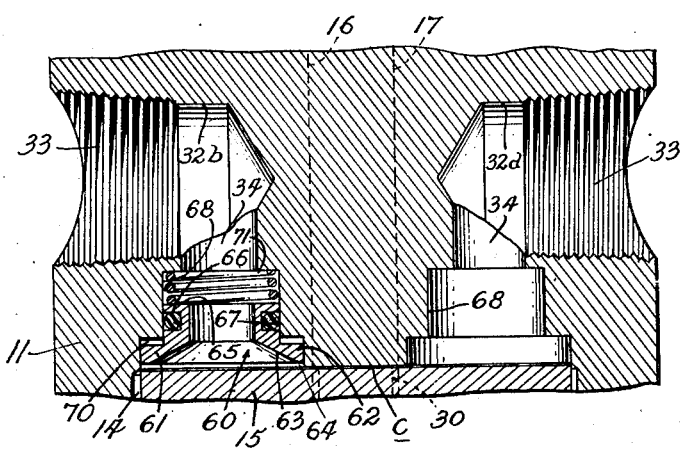

Fig. 3 is a fragmentary vertical sectional view, taken through the work cylinder and return ports 32b and 32d, respectively, of Fig. 1a, but with the porting plate rotated to a closed or neutral position, e. g., 45° from the position of Figs. 1 and 1a.

In Figs. 1–2, inclusive, the valve is designated in its entirety by the reference numeral 10, and comprises a housing 11 which is secured by screws 12 to a flat base member 13. The housing 11 is preferably, although not necessarily, cylindrical in form, and is provided at one end with an axial bore 14 which serves as a valve chamber, containing a rotary valve member or porting plate 15. The housing 11 is provided with a central bore 16 of reduced diameter, in which is journaled an operating shaft 17, said shaft extending through the housing and protruding from the outer face thereof. The outer end of the shaft 17 is enlarged somewhat in diameter and is knurled at 18 to receive a handle or crank arm (not shown). The outer face of the valve body 11 is counterbored at 20 to receive a hub 21 on the shaft 17, said hub having an annular groove 22 formed in the periphery thereof which receives a donut, or ring seal 23 of resilient material such as rubber, neoprene, or the like. The bottom shoulder 24 of the hub bears on the bottom of the counterbore 20, while the top shoulder 25 thereof is engaged by a washer 26 which is received within a recess and is retained by a snap ring 27, the latter being seated in a groove 28 in the sides of the recess. The bottom end of the shaft 17 has flats 30 provided thereon and is received within a flat-sided hole 31 in the center of the porting plate 15.

Radially extending ports 32a, 32b, 32c and 32d are drilled into the sides of the valve body 11; the illustrated valve having four of such ports arranged at 90 degrees to one another around the axis of the valve (see Fig. 1a). The number and spacing of these ports is not limited to the arrangement shown, however, but might be varied in any desired manner without departing from the scope of the invention. Each of the ports 32a, 32b, 32c and 32d is tapped to provide a tapered pipe thread 33 for connection of the usual pipe line fittings to the valve.

The ports 32a, 32b, 32c and 32d intersect drilled passages 34 which are disposed parallel to the axis of the valve body 11 and open into the top end of the chamber 14. The passages 34 are counterbored at 35, providing enlarged cylindrical chambers within which are disposed floating valve seats 36.

Each of the valve seats 36 is tubular in shape and is chamfered at its lower end at 40 and 41 to form a narrow seating face 42, preferably of lesser area than the cross-sectional area of the seat body at its opposite or top end, which bears on the top surface of the porting plate 15. Preferably, the porting plate and valve seats are made of hardened steel, and their mating faces are lapped for smoothness and flatness. A circumferential groove 43 is provided in the outer side walls of the valve seat intermediate its ends, and disposed within this groove is a donut, or ring seal 44 of neoprene, rubber, or the like. The ring seal 44 is preferably of circular cross section, and is proportioned to project slightly above the surface of the tubular member 36 as to bear against the wall of the chamber 35. A marcel spring washer 45 engages the top end of the valve seat 36 and yieldingly urges the seat down against the porting plate 15, said spring bearing against the shoulder 46 formed at the junction of the counterbore 35 with the passage 34.

The porting plate 15 is preferably in the form of a thick disk having ports 50 provided therein corresponding in number and arrangement to the passages 34. The ports 50 open through the top surface of the porting plate 15, and adjacent pairs of ports are interconnected by a pair of parallel internal passageways 51a and 51b (see Figs. 1 and 1a). The bottom of the porting plate is formed with an annular ridge 52 which bears against the top surface of the mounting plate 13 to provide thrust bearing support for the porting plate. It will be appreciated that the simple bearing surface afforded by the ridge 52 might be replaced by a ball or roller thrust bearing to reduce friction, without departing from the spirit of my invention. A ring seal 53 of neoprene is retained within an annular groove 54 formed in the valve body and bears against the outside surface of the porting plate 15 and against the sides of the groove and the face of the base member 13 to seal the joint formed by the junction of the valve body with the base member against leakage.

The operation of the above described embodiment of my invention is believed to be self-evident from the preceding description. When the valve is in the position shown in Fig. 1, fluid from the pressure source entering the top port 32a passes through the passage 34 and the central bore of the valve seat 36, through the ports 50 and passage 51a in the porting plate, and out through the valve seat and passages of the discharge port 32b in the near side of the valve body. The last mentioned discharged port 32b is typically connected in the usual way to one of the cylinder lines, the other of which being then connected to the port 32c in the far side of the valve body (Figure 1). Cylinder fluid will accordingly enter the valve through this far side port 32c, and will pass through the corresponding passage 34 and the porting plate passage 51b to reach the lower passage 34 and the valve port 32d, understood to be connected to the return line leading to the reservoir. The floating valve seats 36 are yieldingly urged down into sealing engagement with the porting plate 15 by the springs 45 and by hydraulic pressure acting against the top surface thereof. The amount of hydraulic pressure exerted on the valve seat depends upon the difference in exposed area at the top and bottom ends of the seat, the exposed area at the bottom of the seat being the projected area of the inside bevel 41. Thus, increasing the size of the bevel 41 has the effect of decreasing the effective area at the top of the seat, thereby diminishing the amount of hydraulic pressure urging the seat against the porting plate.

The floating valve seat 36 described above is designed to provide a condition of hydraulic unbalance causing the valve seat to be pressed downwardly against the porting plate 15 by fluid pressure. Under some conditions, however, it is desirable to reverse the hydraulic unbalance so that fluid pressure tends to lift the valve seat from the porting plate against the pressure of the spring holding it down. For example, in the lines leading from the valve 10 to the actuating cylinders, there is a considerable volume of hydraulic fluid which is trapped when the valve is in neutral position (all ports closed), i. e., with the porting plate rotated 45° from the position illustrated in Figs. 1 and 1a, and the thermal expansion of this fluid may cause an excessive rise in pressure in the lines unless provision is made for bleeding some of the fluid off. The valve seat 36 illustrated in Figs. 1 and 2 is urged increasingly harder against the porting plate as the pressure rises and therefore becomes increasingly pressure tight, preventing the escape of fluid.

The valve seat illustrated in Fig. 3 is designed to overcome this condition, however, by providing a larger exposed area on the bottom of the seat than on its top, so that fluid pressure tends to raise the seat and permit escape of fluid through the clearance between the porting plate 15 and the valve body 11 to the adjacent return line port, as shown, with some exaggeration, in Fig. 3. In this embodiment of the invention, the valve seat is designated by the reference numeral 60 and consists of a generally tubular sleeve 61 having a radially flanged portion 62 at the bottom end thereof. The bottom of the seat is chamfered at 63 on its inner corner to form a narrow seating surface 64 which engages and bears against the surface of the porting plate 15. The outer edge of the chamfer 63 is of greater diameter than the tubular portion 61 so that the projected area of the chamfer is greater than the area of the top 65. As in the preceding embodiment, there is a groove 66 formed in the outer surface of the tubular portion 61, and a ring seal 67 is disposed within said groove and engages the side walls of the valve seat chamber 68. The lower end of the valve seat chamber 68 is counterbored at 70 to receive the flange portion 62 of the seat. The valve seat 60 is urged downwardly against the porting plate 15 by a helical compression spring 71 which exerts a pressure on the top end 65 of the seat sufficient to overcome the upward thrust due to hydraulic unbalance and to obtain a satisfactorily fluid-tight seal for all normal pressures. In other words, normally the valve seat is held tight down against the upper face of porting plate 15. When the pressure becomes excessive, however, due to thermal expansion of trapped fluid, for example, in the line between the port 32b and the work cylinder, the upward thrust due to hydraulic pressure causes the seat 60 to be lifted up from the porting plate 15 against the pressure of the spring 71, as shown in Fig. 3. The excess fluid can then escape underneath the slightly lifted seat 60, and can pass through the small clearance space c between the surface 61a of the valve and the upper face of plate 15 until it reaches the bore 68 communicating with return port 32d. The clearance space c may be of the order of thousandths of an inch, but nevertheless furnishes the necessary escape passage. No sealing ring is found in the return bore 68, because at that point there is never any high pressure to seal against.

Although I have shown and described what I consider to be the preferred embodiment of my invention, various changes which will occur now to those skilled in the art may be made in the form and relative arrangement of the various parts without departing from the spirit and scope of the invention. Reference is therefore to be had to the appended claims for a definition of the limits of my invention.

I claim:

1. In a valve, the combination of a body having a cylindrical fluid passage therein, a valve member movable with respect to said body, there being a small clearance space between said valve member and valve body and a fluid outlet leading from said clearance space, a tubular valve seat slidably disposed within said passage and adapted to seat at one end thereof on said valve member, said seat being formed so that the projected area exposed to fluid pressure at said one end exceeds the projected area exposed at the other end, whereby fluid pressure acting on the larger area causes a thrust force to be applied to said seat tending to raise the latter away from said valve member, and spring means yieldingly urging said seat against said valve member, said spring means exerting a force on said seat greater than the hydraulic thrust resulting from normal fluid pressures in said passage but yielding to excessive hydraulic thrust resulting from thermal expansion of the fluid trapped in the passage by the seat and valve member when said valve member is in neutral position, whereby said tubular seat is raised from said valve member and fluid permitted to escape to said clearance space and outlet.

2. In a valve, the combination of a body having a cylindrical fluid passage therein, a valve member movable with respect to said body, there being a small clearance space between said valve member and valve body and a fluid outlet leading from said clearance space, a tubular valve seat slidably disposed within said passage and adapted to seat at one end thereof on said valve member, said seat being formed with a large outside diameter at said one end and a smaller outside diameter at the other end thereof, said passage having large and small diameter portions to receive the large and small ends, respectively, of said seat, means for sealing the clearances between the smaller diameter portion of said valve seat and the smaller diameter portion of said passage, said seat being formed so that the projected area exposed to fluid pressure at said one end exceeds the projected area exposed at the other end, whereby fluid pressure acting on the larger area tends to raise said seat away from said valve member, and spring means yieldingly urging said seat against said valve member, said spring means exerting a force on said seat greater than the hydraulic thrust resulting from normal fluid pressures in said passage but yielding to excessive hydraulic thrust resulting from thermal expansion of the fluid trapped in the passage by the seat and valve member when said valve member is in neutral position, whereby said tubular seat is raised from said valve member and fluid permitted to escape to said clearance space and outlet.

3. In a valve, the combination of a body having a cylindrical fluid passage therein, a valve member movable with respect to said body, there being a small clearance space between said valve member and valve body and a fluid outlet leading from said clearance space, a tubular valve seat slidably disposed within said passage and adapted to seat at one end thereof on said valve member, said seat being formed with a large outside diameter at said one end and a smaller outside diameter at the other end thereof, said passage having large and small diameter portions to receive the large and small ends, respectively, of said seat, said seat being formed so that the projected area exposed to fluid pressure at said one end exceeds the projected area exposed at the other end, whereby fluid pressure acting on the larger area tends to raise said seat away from said valve member, said seat having a circumferential groove formed in the outer surface thereof intermediate its ends, a resilient ring seal disposed within said groove and engaging the sides of said passage, and spring means yieldingly urging said seat against said valve member, said spring means exerting a force on said seat greater than the hydraulic thrust resulting from normal fluid pressures in said passage but yielding to excessive hydraulic thrust resulting from thermal expansion of the fluid trapped in the passage by the seat and valve member when said valve member is in neutral position, whereby said tubular seat is raised from said valve member and fluid permitted to escape to said clearance space and outlet.

4. In a valve, the combination of a body having a cylindrical fluid passage therein, a valve member movable with respect to said body, there being a small clearance space between said valve member and valve body and a fluid outlet leading from said clearance space, a tubular valve seat slidably disposed within said passage and adapted to seat at one end thereof on said valve member, said seat being formed with a large outside diameter at said one end and a smaller outside diameter at the other end thereof, said passage having large and small diameter portions to receive the large and small ends, respectively, of said seat, said seat being formed so that the projected area exposed to fluid pressure at said one end exceeds the projected area exposed at the other end, whereby fluid pressure acting on the larger area tends to raise said seat away from said valve member, said seat having a circumferential groove formed in the outer surface of the small diameter portion thereof, a resilient ring seal disposed within said groove and engaging the sides of said passage, and spring means yieldingly urging said seat against said valve member, said spring means exerting a force on said seat greater than the hydraulic thrust resulting from normal fluid pressures in said passage but yielding to excessive hydraulic thrust resulting from thermal expansion of the fluid trapped in the passage by the seat and valve member when said valve member is in neutral position, whereby said tubular seat is raised from said valve member and fluid permitted to escape to said clearance space and outlet.

5. In a valve, the combination of a body having a cylindrical fluid passage therein, a valve member movable with respect to said body, there being a small clearance space between said valve member and valve body and a fluid outlet leading from said clearance space, a tubular valve seat slidably disposed within said passage and adapted to seat at one end thereof on said valve member, said seat being formed with a large outside diameter at said one end and a smaller outside diameter at the other end thereof, said passage having large and small diameter portions to receive the large and small ends, respectively, of said seat, said tubular seat at said one end having an annular outside sealing area engageable with said valve member and a recessed fluid pressure area inside said sealing area subject to fluid pressure within the tubular seat while said sealing area is in sealing contact with said valve member, said recessed fluid pressure area having a projected area that exceeds the projected area of the tubular seat exposed to fluid pressure at the other end, whereby fluid pressure acting on the larger area tends to raise said seat away from said valve member, and spring means yieldingly urging said seat against said valve member, said spring means exerting a force on said seat greater than the hydraulic thrust resulting from normal fluid pressures in said passage but yielding to excessive hydraulic thrust resulting from thermal expansion of the fluid trapped in the passage by the seat and valve member when said valve member is in neutral position, whereby said tubular seat is raised from said valve member and fluid permitted to escape to said clearance space and outlet.

LILBURN S. BARKSDALE.

REFERENCES CITED

The following references are of record in the file of this patent:

UNITED STATES PATENTS

| Number | Name | Date |
|---|---|---|
| 1,049,123 | Mercer | Dec. 31, 1912 |
| 1,439,720 | Yarnall | Dec. 26, 1922 |
| 1,567,537 | Mockus | Dec. 29, 1925 |
| 1,954,018 | Miller | Apr. 10, 1934 |
| 2,030,458 | McKellar | Feb. 11, 1936 |
| 2,191,232 | Heinen | Feb. 20, 1940 |
| 2,375,633 | Downey | May 8, 1945 |
| 2,377,473 | Wolcott | June 5, 1945 |

FOREIGN PATENTS

| Number | Country | Date |
|---|---|---|
| 487,991 | Germany | 1929 |